United States Patent [19]

Senga et al.

[11] Patent Number: 5,126,430
[45] Date of Patent: Jun. 30, 1992

[54] PROCESS FOR PREPARING POLYARYLENE SULFIDES WITH METAL SALT OF HYDROXYCARBOXYLIC ACID

[75] Inventors: Minoru Senga; Satoshi Ikeuchi, both of Chiba, Japan

[73] Assignee: Idemitsu Petrochemical Company Limited, Tokyo, Japan

[21] Appl. No.: 387,750

[22] Filed: Aug. 1, 1989

[30] Foreign Application Priority Data

Aug. 4, 1988 [JP] Japan .................... 63-195575
Sep. 12, 1988 [JP] Japan .................... 63-228273

[51] Int. Cl.$^5$ .................................................. C08G 75/16
[52] U.S. Cl. ........................ 528/388; 528/226; 528/387
[58] Field of Search ................................ 528/388, 387

[56] References Cited

U.S. PATENT DOCUMENTS

| | | | |
|---|---|---|---|
| 3,354,129 | 11/1967 | Edmonds, Jr. et al. | 260/79 |
| 3,867,356 | 2/1975 | Campbell . | |
| 3,869,433 | 3/1975 | Campbell | 260/79.1 |
| 3,876,591 | 4/1975 | Campbell | 260/79.1 |
| 3,919,177 | 11/1975 | Campbell | 260/79.1 |
| 4,096,132 | 6/1978 | Edmonds, Jr. . | |
| 4,116,947 | 9/1978 | Edmonds, Jr. et al. | 528/388 |
| 4,663,431 | 5/1987 | Fujii et al. . | |
| 4,910,294 | 3/1990 | Ogata et al. | 528/388 |

FOREIGN PATENT DOCUMENTS

| | | |
|---|---|---|
| 59-22926 | 2/1984 | Japan . |
| 61-7332 | 1/1986 | Japan . |
| 63-170422 | 7/1988 | Japan . |

OTHER PUBLICATIONS

English Abstract of DE 3,725,997 (Feb. 11, 1988).

Primary Examiner—Harold D. Anderson
Attorney, Agent, or Firm—Nikaido, Marmelstein, Murray & Oram

[57] ABSTRACT

A process for preparing a polyarylene sulfide involves contacting a sulfur source with a metallic salt of an aliphatic ω-hydroxycarboxylic acid and a dihalogen aromatic compound in an organic polar solvent, thereby carrying out polycondensation with stability in a polymerization system in which a water content is large. the polyarylene sulfide prepared has a high degree of whiteness and with a sufficiently high molecular weight. The use of the metallic salt of ω-hydroxycarboxylic acid in a particular range can provide a novel polyarylene sulfide.

5 Claims, 1 Drawing Sheet

PROCESS FOR PREPARING POLYARYLENE SULFIDES WITH METAL SALT OF HYDROXYCARBOXYLIC ACID

BACKGROUND OF THE INVENTION

1. Field of the Invention

The present invention relates to a process for preparing a polyarylene sulfide and to a novel polyarylene sulfide prepared thereby.

More particularly, the present invention relates to a process for preparing a polyarylene sulfide, in which a hydrous alkali metal sulfide commercially available is used without dehydration and a polymerization promoter can be recovered with ease. The polyarylene sulfide produced is high in its degree of whiteness, the molecular weight of the polyarylene sulfide so produced is sufficiently high, and it is suitable for molding materials for various molded articles, films, fibers, and mechanical, electric and electronic parts.

The present invention can prevent color from being imparted, by the presence of by-products and the like, to the polyarylene sulfide containing a carbonyl group while permitting the high recovery rate of an organic polar solvent, the polyarylene sulfide of this invention being different in solubility from usual polyarylene sulfides. The process can allow the efficient production of the polyarylene sulfide with a high degree of whiteness in high yields.

Furthermore, the novel polyarylene sulfide according to the present invention can be prepared under specified production condition, it is high in its degree of whiteness, it has a resistance to heat as high as the usual polyarylene sulfides, and it is different in solubility from the usual polyarylene sulfides.

2. Description of Related Art

The polyarylene sulfides such as polyphenylene sulfide are thermoplastic while being partially thermosetting, and they have superior properties as engineering plastics, such as excellent resistance to chemicals, favorable mechanical strength over a broad temperature range, and good thermal rigidity.

The polyarylene sulfides such as polyphenylene sulfide have been heretofore prepared by various processes.

U.S. Pat. No. 3,354,129 proposes a process for preparing polyarylene sulfides in which a polyhalogen aromatic compound, such as a dihalogen aromatic compound, is reacted with an alkali metal sulfide in an organic polar solvent.

U.S. Pat. No. 3,919,177 and Japanese Patent Publication (Kokoku) No. 12,240/1977 propose processes for preparing polyarylene sulfides having a high intrinsic viscosity and low melt flowability, in which a p-dihalobenzene is polymerized with an alkali metal sulfide or an alkali metal bisulfide (an alkali metal hydrosulfide, or an alkali metal hydrogen sulfide) as a sulfur source or another appropriate sulfur compound (for example, thiourea, thioamide, thiocarbamate, thiocarbonate, mercaptan, mercaptide, mercaptocarboxylic acid, or the like) to be used with at least one member of a base, in the presence of a promoter such as a carboxylate (a carboxylic acid of the carbohydryl system having from 1 to 20 carbon atoms), e.g., sodium acetate or lithium acetate, in an organic amide.

U.S. Pat. No. 4,116,947 discloses a process for preparing branched polyarylene sulfides having a relatively high molecular weight by contacting a p-dihalobenzene and a polyhalogen aromatic compound with an alkali metal sulfide in the absence or presence of a sodium carboxylate in an N-alkyllactam in an amount of water of 1.2 to 2.4 moles with respect to mole of the alkali metal sulfide.

Those processes, however, present the disadvantages that the water content in the polymerization system needs to be set at a relatively low value within a narrow range in order to provide the polymer with a high production efficiency, which has such a high molecular weight as being highly valuable.

In usual cases, commercially available alkali metal sulfides and hydrosulfides contain a considerably large amount of water so that, if such compounds are employed as a raw material for polymerization as they are, the resulting polymers are not provided with a sufficiently high molecular weight, and a color is imparted to the resulting polymers.

For these reasons, the conventional processes require the alkali metal sulfides or hydrosulfides available usually as a hydrate to be dehydrated prior to polymerization, thereby removing water from the hydrous sulfides or hydrosulfides to reduce a large water content to a relatively low value within a narrow range. Accordingly, the conventional processes require at least two steps, such as dehydration and polycondensation steps. The provision of a dehydration step presents the following disadvantages. The dehydration step is usually carried out by means of a distillation in the presence of a polar solvent. However, a stainless steel reactor may get eroded and impurities may be dissolved from the inner wall of the reactor into the polar solvent, thereby impairing the purity and whiteness of the resulting polyarylene sulfide, or transforming the polar solvent to be recovered.

Furthermore, Japanese Patent Publication (Kokai) No. 22,926/1984 discloses a process in which a dihalogen aromatic compound is reacted with a substantially anhydrous metal sulfide and a metal carbonate in the presence of a minute amount of water. This process, however, produces a large amount of by-products, such as oligomers, and provides polyarylene sulfides with an insufficiently high molecular weight. The yield of the resulting polymer is low. Furthermore, a long period of time is required for enlargement of the molecular weight of the resulting polymer, so that this process is industrially disadvantageous.

The processes disclosed in U.S. Pat. Nos. 3,919,177 and 4,116,947 and Japanese Patent Publication No. 12,240/-1977 further suffer the disadvantages that a recovery and re-use of the polymerization promoter, such as sodium acetate or lithium acetate, is difficult. In order to recover the polymerization promoter, the process becomes so complicated that the economy is worsened. If the polymerization promoter is discharged into a water sewage system, a pollution problem arises.

Furthermore, the process disclosed in U.S. Pat. No. 4,116,947 uses a polyhgalogen aromatic compound as a branching agent, thereby enlarging molecular weights of branched polyphenylene sulfides.

As other processes for enlarging a molecular weight of a polyarylene sulfide, Japanese Patent Publication (Kokoku) No. 7,332/1986 propose processes, however, they present the disadvantage that the resulting polymers are likely to get gelled so that they pose problems with manufacture and quality.

Furthermore, the process disclosed in U.S. Pat. No. 4,116,947 has the drawback that the organic polar solvent used is restricted to expensive solvents, such as the lactams.

For instance, U.S. Pat. No. 3,867,356 discloses a process in which a dihalogen aromatic compound is reacted with an alkali metal hydrosulfide in an organic amide compound as a solvent in the presence of an alkali metal aminocarboxylate as represented by the general formula:

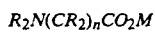

where

R is a hydrogen atom, an alkyl group, a cycloalkyl group or an aryl group, or a combination thereof;

M is lithium, sodium, potassium, rubidium or cesium; and n is an integer from 1 to 12.

This process, however, presents the problem that the resulting polyarylene sulfide is colored due to by-products created by the side reactions between the polyhalogen aromatic compound and the alkali metal aminocarboxylate, thereby not yielding polyarylene sulfides with a high degree of whiteness and with a high molecular weight.

U.S. Pat. No. 3,869,433 proposes a process in which an alkali metal hydroxide is present in the reaction of a polyhalogen aromatic compound with an alkali metal hydrosulfide in an organic amide compound as a solvent. In this process, however, the organic amide compound is decomposed so that the solvent cannot be recovered and reused. This is industrially disadvantageous. Furthermore, the resulting polyarylene sulfide is colored, whereby polyarylene sulfide with a high degree of whiteness is not made.

U.S. Pat. No. 3,876,591 discloses a process for preparing polyarylene sulfides, in which an alkali metal hydrosulfide is used at amounts by 0.8 to 1.5 times of the molar amount of a polyhalogen aromatic compound. This process produces a large quantity of oligomers as by-products, thereby lessening the yield of the polyarylene sulfide and not providing polyarylene sulfide with a high molecular weight.

These conventional processes have the drawbacks that polyarylene sulfides cannot be prepared which have sufficient melt properties and unique characteristics such as functional groups. Thus demands have been made to provide novel polyarylene sulfides and a process for the preparation thereof in order to satisfy demands for various and diversified properties.

SUMMARY OF THE INVENTION

Therefore, as one present invention has the object to provide a process for preparing a novel polyarylene sulfide, which allows polymerization with ease and stability to a comparably high molecular weight value over a broad range of a water content, which produces a polyarylene sulfide having a high degree of whiteness and a sufficiently high molecular weight in higher yields, which can recover a polymerization promoter or aid with ease and which permits the efficient production, in high yields, of a polyarylene sulfide which is sufficiently high in molecular weight and excellent in whiteness, even if a hydrate or an aqueous mixture of an alkali metal sulfide or hydrosulfide which is readily available on the market, such as an industrial grade hydrous sodium sulfide is used.

The present invention has another object to provide a process which can prepare a polyarylene sulfide with high efficiency and in high yields, which polyarylene sulfide is high in whiteness and different from the usual polymers in solubility and other properties.

The present invention has a further object to provide a polyarylene sulfide with a novel structure, which is high in whiteness and different from the usual polymers in solubility and other properties.

In order to achieve these objects, the present invention consists of a process for preparing a polyarylene sulfide, comprising the step of contacting a dihalogen aromatic compound with a source of sulfur and a metallic salt of $\omega$-hydroxycarboxylic acid in an organic polar solvent.

In order to achieve a further object, the present invention consists of a polyarylene sulfide containing a carbonyl group, which is insoluble in $\alpha$-chloronaphthalene.

BRIEF DESCRIPTION OF THE DRAWING

The single FIGURE is an infrared absorption spectrum of one example of the compounds obtained by the process of the present invention.

DESCRIPTION OF THE PREFERRED EMBODIMENTS

Figure 1:
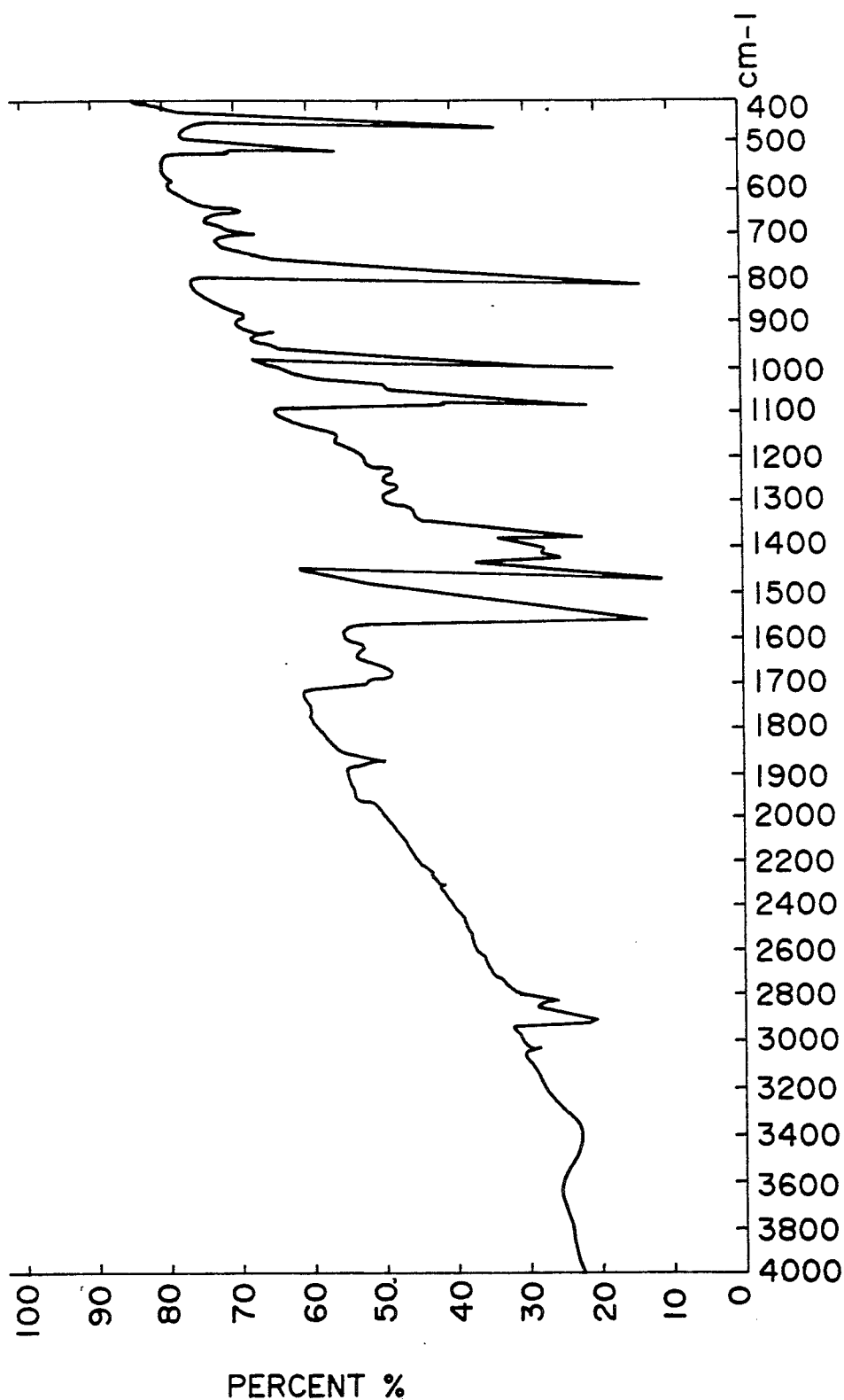

The process of and the polyarylene sulfide made according to, the present invention will be described.

The process according to the present invention involves contacting a sulfur source and a metallic salt of an $\omega$-hydroxycarboxylic acid with the dihalogen aromatic compound reactant in an organic polar solvent.

The sulfur source may be selected from an alkali metal sulfide, an alkali metal hydrosulfide, and hydrogen sulfide.

The alkali metal sulfide may include, for example, sodium sulfide, lithium sulfide, potassium sulfide, rubidium sulfide and cesium sulfide. Preferred are lithium sulfide and sodium sulfide. The alkali metal sulfide may be used singly or in combination thereof.

The alkali metal hydrosulfide may include, for example, lithium hydrosulfide (LiHS), sodium hydrosulfide (NaHS), rubidium hydrosulfide (RbHS), potassium hydrosulfide (KHS), and cesium hydrosulfide (CsHS). Sodium hydrosulfide and rubidium hydrosulfide are preferred, and sodium hydrosulfide is more preferred. The alkali metal hydrosulfide may be used singly or in combination thereof.

The alkali metal sulfides and hydrosulfides may be used in the form of an anhydride form or in the form of a commercially available or industrial grade hydrate, hydrous material, aqueous solution, or aqueous mixture. When they are used in the form of the hydrate, hydrous material, aqueous solution or aqueous mixture, they may be dehydrated prior to polymerization if they contain a water content so large as not to set the water content of the polymerization system within the range as will be described hereinabove or they may be employed as they are without dehydration if they contain water in such an amount that the water content in the polymerization system can be set within the range.

It is preferred that the alkali metal hydrosulfide is employed with a base. The base may be any acid receptor which can convert the alkali metal hydrosulfide into the alkali metal sulfide or effectively neutralize or receive a hydrogen halide producible by condensation of the alkali metal hydrosulfide with the dihalogen aromatic compound and which does not adversely affect the object of the present invention. The base may be of an inorganic type and of an organic type. The inorganic salt may preferably include, for example, an alkali metal hydroxide, such as lithium hydroxide, sodium hydroxide, potassium hydroxide, rubidium hydroxide, and cesium hydroxide. Lithium hydroxide and sodium hydroxide are preferred, and sodium hydroxide is more preferred. The base may be used usually at least in an amount of an equimolar equivalent at the maximum per equivalent (mole) of the alkali metal hydrosulfide. The base may be used singly or in combination thereof.

As the sulfur source there may be used hydrogen sulfide together with or in place of the alkali metal hydrosulfide. It is preferred to use hydrogen sulfide which has been sufficiently purified. When hydrogen sulfide is used in place of the alkali metal hydrosulfide, it is preferred to use a base as in the case where the alkali metal hydrosulfide is used. The base to be used together with hydrogen sulfide may be the same as that used with the alkali metal hydrosulfide, as well as the kind, preferred kind, and amount of the base may the same as it is employed with the alkali metal hydrosulfide.

As the metallic salt of the ω-hydroxycarboxylic acid may be employed various kinds, and generally the metallic salt of the ω-hydroxycarboxyl acid may be represented by the following general formula:

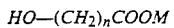

$$HO-(CH_2)_nCOOM$$

wherein

M is an alkali metal; and n is an integer of 2 to 8, preferably 3 to 5.

The alkali metal represented by the symbol M may include, for example, lithium, sodium, potassium, rubidium or cesium. Lithium and sodium are preferred, and sodium is more preferred.

The metallic salt of the ω-hydroxycarboxylic acid as represented by the above general formula may include, for example, lithium 4-hydroxybutyrate, sodium 4-hydroxybutyrate, potassium 4-hydroxybutyrate, rubidium 4-hydroxybutyrate, cesium 4-hydroxybutyrate, lithium 5-hydroxyvalerate, sodium 5-hydroxyvalerate, potassium 5-hydroxyvalerate, rubidium 5-hydroxyvalerate, cesium 5-hydroxyvalerate, lithium 6-hydroxycaprylate, sodium 6-hydroxycaprylate, potassium 6-hydroxycaprylate, rubidium 6-hydroxycaprylate, cesium 6-hydroxycaprylate, and so on. Preferred is sodium 4-hydroxybutyrate. The metallic salt of the ω-hydroxycarboxylic acid may be used singly or in combination thereof. The metallic salt of the ω-hydroxycarboxylic acid may be used in the form of an anhydride, a hydrate or an aqueous solution. When it is used in the form of a hydrate or an aqueous solution, it is dehydrated prior to polymerization in the manner as will be described hereinbelow as in the case where the alkali metal hydrosulfides or sulfides are used in the form of a hydrate or an aqueous solution.

The dihalogen aromatic compound to be used for the process according to the present invention may be any conventional one and may include, for example, a dihalogen aromatic compound such as m-dihalobenzene and p-dihalo-benzene: an alkyl-substituted dihalobenzene such as 2,3-dihalotoluene, 2,5-dihalotoluene, 2,6-dihalotoluene, 3,4-dihalotoluene, 2,5-dihaloxylene, 1-ethyl-2,5-dihalobenzene, 1,2,4,5-tetramethyl-3,6-dihalobenzene and 1-n-hexyl-2,5-dihalobenzene; a cycloalkyl-substituted dihalobenzene such as 1-cyclohexyl-2,5-dihalobenzene; an aryl-substituted dihalobenzene such as 1-phenyl-2,5-dihalobenzene, 1-benzyl-2,5-dihalobenzene and 1-p-toluyl-2,5-dihalobenzene; a dihalobiphenyl such as 4,4'-dihalobiphenyl; and a dihalonaphthalene such as 1,4-dihalonaphthalene, 1,6-dihalonaphthalene, and 2,6-dihalonaphthalene. The two halogen atoms in the dihalogen aromatic compounds may be the same or different from each other and may be those replaced, for example, by fluorine, chlorine, bromine or iodine. Dihalobenzenes are preferred, and p-dichlorobenzene and p-dichlorobenzene containing 20 mol% or lower of m-dichlorobenzene are particularly preferred.

As the organic polar solvent may be used a an aprotic polar solvent such as an organic amide compound, a lactam compound, a urea compound, and a cyclic organophosphorus compound.

The amide compound may include, for example, a formamide such as N,N-dimethylformamide, an acetamide such as N,N-dimethylacetamide, N,N-diethylacetamide and N,N-dipropylacetamide, and an amide such as N,N-dimethylbenzamide, and the like.

The lactam compound may include, for example, a caprolactam such as caprolactatm, N-methylcaprolactam, N-ethylcaprolactam, N-n-propylcaprolactam, N-isopropylcaprolactam, N-n-butylcaprolactam, N-isobutylcaprolactam and N-cyclohexylcaprolactam, a pyrrolidone such as N-methyl-2-pyrrolidone, N-ethyl-2-pyrrolidone, N-n-propyl-2-pyrrolidone, N-isopropyl-2-pyrrolidone, N-n-butyl-2-pyrrolidone, N-isobutyl-2-pyrrolidone, N-cyclohexyl-2-pyrrolidone, N-methyl-3-methyl-2-pyrrolidone, N-ethyl-3-methyl-2-pyrrolidone and N-methyl-3,4,5-trimethyl-2-pyrrolidone, a piperidone such as N-methyl-2-piperidone, N-ethyl-2-piperidone, N-propyl-2-piperidone, N-isopropyl-2-piperidone, N-methyl-6-methyl-2-piperidone, N-methyl-3-ethyl-2-piperidone, and the like.

The urea compound may include, for example, tetramethyl urea, N,N'-dimethylethylene urea, and N,N'-dimethylpropylene urea.

As the cyclic organophosphorus compound may be used, for example, 1-methyl-1-oxosulphorane, 1-ethyl-1-oxosulphorane, 1-phenyl-1-oxosulphorane, 1-methyl-1-oxophosphorane, 1-n-propyl-1-oxophosphorane, 1-phenyl-1-oxophosphorane, and the like.

Among the organic polar solvents, the amide compound or lactam may be conveniently used. Preferred are an N-alkyllactam and an N-alkylpyrrolidone. More preferred is N-methylpyrrolidone. The organic polar solvent may be used singly or in combination thereof.

In accordance with the present invention, the polymerization may be carried out by contacting the sulfur source with the dihalogen aromatic compound and the metallic salt of the ω-hydroxycarboxylic acid in appropriate ratios in the organic polar solvent. In this reaction, the metallic salt of the ω-hydroxycarboxylic acid serves as a polymerization promoter or aid.

The metallic salt of the ω-hydroxycarboxylic acid may be used in an amount ranging generally from 0.02 to 2 moles, preferably from 0.05 to 1 mole, with respect to mole of the alkali metal sulfide and/or the alkali metal hydrosulfide. If the amount is below the lower limit, a polymerization rate becomes so slow that a molecular weight of the resulting polymer cannot be enlarged. If the amount exceeds the upper limit, a polymerization rate cannot be accelerated or a molecular weight of the polymer cannot be enlarged as such a large amount of the metallic salt of the ω-hydroxycarboxylic acid is used, as well as a cost of the polymerization promoter is raised.

It is interesting to note herein that the metallic salt of the ω-hydroxycarboxylic acid is incorporated into the polymer, on top of the serving as the polymerization promoter, thereby serving, too, to yield the novel polyarylene sulfide containing a carbonyl group, which is insoluble in α-chloronaphthalene.

In order to provide the novel polyarylene sulfide according to the present invention, the metallic salt of the ω-hydroxycarboxylic acid may be used in an amount ranging generally from 0.8 to 2.0 moles, preferably from 1 to 2 moles, with respect to mole of the alkali metal sulfide and/or hydrosulfide, or it may be used in an amount generally from 1.6 to 4 moles, preferably from 2 to 4 moles, with respect to mole of hydrogen sulfide.

The dihalogen aromatic compound may be used in an amount ranging generally from 0.75 to 2.0 moles, preferably from 0.90 to 1.2 moles, with respect to mole of the sulfur source. The use of the dihalogen aromatic compound in the amount below the lower limit may produce by-products, while the use thereof above the upper limit may reduce a molecular weight of the resulting polyarylene sulfide.

The amount of the organic polar solvent is not restricted to a particular range as long as it is sufficient to proceed with the reaction in a homogeneous manner. It may be conveniently in the range from 0.1 to 10 times of the total weight of the components consisting of the sulfur source, dihalogen aromatic compound, the metallic salt of the ω-hydroxycarboxylic acid, as well as the additives and other components to be added as desired. If the solvent is used in the amount below the lower limit, the reaction does not proceed to a sufficient extent. If the amount of the solvent exceeds the upper limit, a volume efficiency is worsened, thereby reducing a productivity.

In the polymerization system, water may be contained at a rate ranging from approximately 0.2 to 6 moles per mole of the sulfur source. If the water content is below the lower limit, a polymerization rate becomes so slow that a molecular weight of the polymer cannot be enlarged. The water content above the upper limit in the polymerization system may cause by-production, or enlargement of a molecular weight of the polymer may become insufficient. Furthermore, a pressure may in some cases be elevated to a remarkably high level during polymerization.

In the conventional processes for the production of the polyarylene sulfides, commercially available or industrial grade alkali metal sulfides or hydrosulfides are used for polymerization usually after dehydration. It is to be noted, however, that the process of the present invention does not require dehydration prior to polymerization and the reaction may proceed without intervention even if such alkali metal sulfides or hydrosulfides are used and a large quantity of water is contained in the polymerization system. Furthermore, this process can provide polyarylene sulfides having a high degree of whiteness and a relatively high molecular weight. This is deserved to draw attention.

Accordingly, the process according to the present invention is a simpler yet more useful process because a dehydration step can be omitted even if commercially available or industrial grade alkali metal sufides or hydrosulfide in the form of a hydrate or an aqueous mixture with a relatively large water content would be used as they are.

It is to be noted, however, that water may be added to the polymerization system together with or separately from the sulfur source such as the alkali metal sulfide or hydrosulfide, or in combination thereof.

As the step of adjusting the water content in the polymerization system, there may be used the step of merely admixing the components to be used without the use of dehydration prior to polymerization, by adding water if required, or the step of dehydrating the components prior to polymerization. In other words, as long as the water content in the polymerization system can be adjusted within the range as have been specified hereinabove, the dehydration step may not be required to be carried out prior to polymerization, although the dehydration step may be carried out prior to the polymerization step, if required.

In accordance with the process of the present invention in which the sulfur source is cotacted with the dihalogen aromatic compound and the metallic salt of the ω-hydroxycarboxylic acid, various additives may be optionally added to the polymerization system. The additives may include, for example, another polymerization promoter or aid, a branching agent such as an active hydrogen-containing halogen aromatic compound, a polyhalogen aromatic compound, and a halogen aromatic nitro compound, an end-capped agent such as a monohalogen aromatic compound or an active hydrogen-containing compound, a reducing agent, an inert organic solvent, and so on.

Such another polymerization promotor or aid may include, for example, an alkali metal halide, an alkali metal carboxylate, an alkali metal carbonate, an alkali metal borate, and so on.

The alkali metal halide may include, for example, a fluoride, chloride, bromide and iodide of an alkali metal such as lithium, sodium, potassium, rubidium, and cesium. More specifically, the alkali metal halide may include, for example, lithium fluoride, sodium fluoride, potassium fluoride, lithium chloride, sodium chloride, potassium chloride, rubidium chloride, cesium chloride, lithium bromide, sodium bromide, cesium bromide, lithium iodide, sodium iodide, potassium iodide, cesium iodide, and the like. Preferred is lithium chloride.

The alkali metal carboxylate may include, for example, an alkali metal salt, such as lithium, sodium, potassium, and cesium, of a carboxylic acid including a saturated aliphatic carboxylic acid such as formic acid, acetic acid, propionic acid, butyric acid, isobutyric acid, valeric acid, hexanoic acid, octanoic acid, and stearic acid; an aromatic carboxylic acid such as benzoic acid; a saturated aliphatic dicarboxylic acid such as oxalic acid and malonic acid; an aliphatic unsaturated dicarboxylic acid such as fumaric acid; an aromatic dicarboxylic acid such as phthalic acid; and an aliphatic oxy acid such as tartaric acid. More particularly, the alkali metal carboxylates may include, for example, lithium formate, sodium formate, lithium acetate, sodium acetate, potassium acetate, cesium acetate, lithium propionate, sodium propionate, lithium butyrate, sodium butyrate, lithium isobutyrate, sodium isobutyrate, lithium valerate, sodium valerate, lithium hexanoate, sodium hexanoate, lithium octanoate, sodium octanoate, lithium stearate, sodium stearate, lithium benzoate, sodium benzoate, potassium benzoate, lithium oxalate, sodium oxalate, lithium malonate, sodium malonate, lithium fumarate, sodium fumarate, lithium phthalate, sodium phthalate, lithium tartrate, and sodium tartrate. Preferred are lithium acetate, sodium acetate, and lithium benzoate.

The alkali metal carbonate may include, for example, lithium carbonate, sodium carbonate, potassium carbonate, rubidium carbonate and cesium carbonate. Lithium carbonate and sodium carbonate is preferred, and lithium carbonate is more preferred.

The alkali metal borate may include, for example, lithium borate, sodium borate, potassium borate, and cesium borate. Lithium and sodium borates are preferred, and lithium borate is preferred.

As the active hydrogen-containing halogen aromatic compound as one of the branching agent may be employed a halogen aromatic compound with an active hydrogen-containing group or groups, such as an amino group, mercapto group, hydroxyl group or the like. More specifically, the active hydrogen-containing halogen aromatic compound may include, for example, a dihaloaniline such as 2,6-dichloroaniline, 2,5-dichloroaniline, 2,4-dichloroaniline and 2,3-dichloroaniline, a trihaloaniline such as 2,3,4-trichloroaniline, 2,3,5-trichloroaniline, 2,4,6-trichloroaniline and 3,4,5-trichloroaniline, an amino-containing halogen aromatic compound including a dihaloaminodiphenyl ether such as 2,2'-diamino-4,4'-dichlorodiphenyl ether and 2,4'-diamino-2',4-dichlorodiphenyl ether, and a mixture thereof. Furthermore, those in which the amino group is replaced by the other functional group such as the thiol group or the hydroxyl group may also be used. There may also be used an active hydrogen-containing halogen aromatic compound, in which a hydrogen atom or atoms joined to the carbon atom or atoms forming its aromatic ring is or are replaced by another inert group or groups such as a carbohydryl group, i.e., an alkyl group. Among the active hydrogen-containing halogen aromatic compounds, the active hydrogen-containing dihalogen aromatic compound is preferred. Dichloroaniline is more preferred.

The polyhalogen aromatic compound as one of the branching agents may include, for example, a trihalobenzene such as 1,2,4-trichlorobenzene and 1,3,5-trichlorobenzene and a trihalonaphthalene such as 1,4,6-trichloronaphthalene. Particularly, 1,2,4-trichlorobenzene and 1,3,5-trichlorobenzene are preferred.

The halogen aromatic nitro compound may include, for example, a mono- or dihalonitrobenzene such as 2,4-dinitrochlorobenzene or 2,5-dichloronitrobenzene, a dihalonitrodiphenyl ether such as 2-nitro-4,4'-dichlorodiphenyl ether, a dihalonitrodiphenyl sulfone such as 3,3'-dinitro-4,4'-dichlorodiphenyl sulfone, a mono- or di-halonitropyridine such as 2,5-dichloro-3-nitropyridine or 2-chloro-3,5-dinitropyridine, or a dihalonitronaphthalene.

The use of the branching agent, such as the active hydrogen-containing halogen aromatic compound, the polyhalogen aromatic compound, and the halogen aromatic nitro compound may serve as increasing branches of the resulting polymer, thereby further enlarging a molecular weight thereof, or as reducing a salt content, thereby further improving various properties of the resulting polymer.

The amount of the branching agent may be in the range generally from 0.0002 to 0.05 mole, preferably from 0.002 to 0.03 mole, with respect to mole of the dihalogen aromatic compound.

The monohalogen aromatic compound to be added as an end-capped agent may include, for example, chlorobenzene, bromobenzene, α-bromobenzene, α-chlorotoluene, o-chlorotolucne, m-chlorotoluene, p-chlorotoluene, α-bromotoluene, o-bromotoluene, m-bromotoluene, and p-bromotoluene.

The active hydrogen-containing compound may include, for example, a thiophenol, phenol, aniline, and so on.

As a branching agent or an end-capped agent, a compound having three or more than three reactive halogen atoms, such as cyanuric chloride, may also be used.

The branching agent or the end-capped agent may be used singly or in combination thereof.

The reducing agent may include, for example, a hydrazine, metal hydride, alkali metal formate, and sulfur. The metal hydride is preferred, as well as sodium borohydride and calcium hydride are more preferred.

The inert solvent may include, for example, a hydrocarbon such as benzene, toluene, xylene, biphenyl, terphenyl, naphthalene, or anthracene, an ether such as diphenyl ether, p-diphenoxybenzene, polyethylene glycol, or dioxane, or the like. A high-boiling-point inert organic solvent is preferred.

In accordance with the process of the present invention, the components such as the sulfur source, the metallic salt of the ω-hydroxycarboxylic acid, and the dihalogen aromatic compound may be added in any order as long as they can be polymerized in the organic polar solvent. A preferred feature will be described hereinafter.

In other words, the sulfur source, the dihalogen aromatic compound, and the metallic salt of the ω-hydroxycarboxylic acid are contacted with each other in the organic polar solvent such as the organic amide compound.

It is preferred that a mixture of the sulfur source and the dihalogen aromatic compound with the organic polar solvent is first dehydrated and the resulting dehydrated mixture is then contacted with the metallic salt of the ω-hydroxycarboxylic acid.

The dehydration can be carried out by means of a distillation. It is preferred that the dehydration is carried out, for example, at a temperature of 150° to 202° C. in an inert gas, such as in a stream of nitrogen. however, the dehydration may be effected by heating under reduced pressures. A dehydrating agent such as calcium oxide or calcium chloride may be employed.

The polymerization may be carried out at a temperature ranging generally from 180° to 330° C., preferably from 210° to 290° C. Temperatures below the lower limit makes a reaction rate so slow that it is not practically applicable, while temperatures above the upper limit causes by-production and degrades or decomposes the resulting polymer, thereby imparting a color or causing gellation.

Although a reaction time may vary with kinds and amounts of the various components and polymerization promoter or aid, or a reaction temperature, it may range generally within 24 hours, preferably from 1 to 24 hours.

The polycondensation may be carried out in an ambient atmosphere of an inert gas such as nitrogen, argon or carbon dioxide.

A reaction pressure is not restricted to a particular range and may be generally up to 50 kg/cm², (absolute pressure) from the self pressure of the polycondensation system such as the solvent. The polycondensation may be a one-stage reaction in which the reaction is carried out at a stationary temperature or a multiple-stage reaction in which the reaction temperature is elevated in a stepwise manner or in a continuously ascending manner.

After completion of the polymerization, the resulting polyarylene sulfide may be isolated by separating it directly from a reactor by a standard method such as filtration or centrifugal separation or by separating it from the reaction mixture after addition of a flocculating agent such as water and/or a dilute acid.

The polymer separated is then washed usually with water, methanol, methylene chloride, chloroform, acetone, benzene, toluene, or the like, to remove the alkali metal halide, alkali metal hydrosulfide, solvent and the like adhering to the polymer. The resulting polymer may be effectively recovered by removing the solvent from the reaction mixture without separation therefrom and by washing the residue in the same manner as above. The solvent recovered may be reused.

If the sulfur source is used in an excessive amount, the reaction mixture (a mother liquor) separated and/or washings used may be adjusted to an acidic range and distilled to thereby recover the excessive amount of the metallic salt of the ω-hydroxycarboxylic acid as a lactone which, in turn, is conveniently purified and then treated with an alkali metal hydroxide, thereby converting it to the corresponding metallic salt of the carboxylic acid. This may be re-used.

The process according to the present invention provides the polyarylene sulfides having a high degree of whiteness in high yields with a high production efficiency as well as with ease and stability.

The polyarylene sulfides according to the present invention presents the characteristics that they contains a carbonyl group, which is prepared by using the metallic salt of the ω-hydroxycarboxylic acid, and that they are insoluble in α-chloronaphthalene which is used for measuring an intrinsic viscosity of the polyarylene sulfides. Accordingly, they can be utilized as molding materials and, if necessary, may be subjected to desalting treatment in order to reduce a content of a salt such as sodium chloride in the polymer.

In molding the polyarylene sulfides according to the present invention, for example, other polymers, pigments, fillers such as graphite, talc, calcium carbonate, mica, carbon black, glass powder, quartz powder, glass fibers, carbon fibers, stabilizers, lubricants may be added.

The polyarylene sulfides according to the present invention may be used as matrix resins for various molded products and composite materials, and they can be molded into films, sheets, fibers, and various articles and items and can be conveniently used for mechanical, electrical and electronic parts.

The present invention will be described by way of examples with reference to comparative examples.

Synthesis of Sodium 4-Hydroxybutyrate:

A solution was prepared by dissolving 50.5 g (1.26 moles) of sodium hydroxide in 300 ml of purified water.

To this sodium hydroxide aqueous solution was dropwise added 172 g (2 moles) of γ-butyrolactone gradually at room temperature. After completion of the dropwise addition, the mixture was elevated to 100° C. and the reaction was carried out for 1 hour. After completion of the reaction, approximately 800 ml of water was removed off, leaving crude materials in a white color. The crude materials are washed twice with 1 liter of acetone and then dried in vacuo, yielding 190.81 g of white powdery product.

The white powdery product was confirmed that it was sodium 4-hydroxycarboxybuyrate as a result of infrared absorption spectrum as follows:

$$\nu_{CO_2Na} = 1,500 - 1,600 \text{ cm}^{-1}$$

$$\nu_{OH} = 3,200 - 3,400 \text{ cm}^{-1}$$

The melting point [Tm] of the white powdery product was Tm=185° C.

EXAMPLE 1

A 1-liter autoclave was charged with 70.59 g (0.543 mole) of commercially available sodium sulfide of industrial grade (water content: approximately 40% by weight), 79.83 g (0.543 mole) of p-dichlorobenzene, 6.84 g (0.543 mole) of sodium 4-hydroxybutyrate, and 304 ml of N-methylpyrrolidone, and replenished with nitrogen gas. The autoclave was closed and elevated to 260° C. at which the polycondensation was carried out for 3 hours.

After completion of the reaction, the temperature within the autoclave was cooled down to room temperature, and the reaction mixture was washed with water and acetone in conventional manner, leaving a solid material.

The solid material was then dried by heating at 100° C. under highly reduced pressures over the period of 20 hours, yielding 49.85 g (85%) of polyphenylene sulfide in a white color.

This product was found to have an inherent viscosity $[\eta_{inn}]$ of 0.17 when measured in 1-chloronaphthalene at a concentration of 0.4 g/dl at a temperature of 206° C.

It was further found that N-methylpyrrolidone recovered was little colorless and no rust was formed on the autoclave.

EXAMPLE 2

The procedures of Example 1 were followed with the exception that, in place of hydrous sodium sulfide, 63.35 g (0.543 mole) of commercially available sodium hydrosulfide of industrial grade (NaHS; water content: about 52% by weight), and 21.72 g (0.543 mole) of sodium hydroxide in a pellet form were used, yielding 48.67 g (83%) of polyphenylene sulfide in a white color.

This product was found to have an inherent viscosity $[\eta_{inn}]$ of 0.16 when measured in 1-chloronaphthalene at a concentration of 0.4 g/dl at a temperature of 200° C.

It was further found that N-methylpyrrolidone recovered was in a pale yellow and no rust was formed on the autoclave.

EXAMPLE 3

The procedures of Example 1 were followed with the exception that the amount of sodium 4-hydroxybutyrate was changed to 20.52 g (0.163 mole) and 12.7 g of water was added, yielding 51.61 g (88%) of polyphenylene sulfide in a white color.

This product was found to have an inherent viscosity $[\eta_{inn}]$ of 0.15 when measured in 1-chloronaphthalene at a concentration of 0.4 g/dl at a temperature of 200° C.

COMPARATIVE EXAMPLE 1

The procedures of Example 1 were followed with the exception that sodium 4-hydroxybutyrate was not used, yielding 53.95 g (92%) of polyphenylene sulfide in a pale brown color. This product was found to have an inherent viscosity $[\eta_{inn}]$ of 0.11.

As is apparent from the above, the polymer obtained in the Comparative Example 1 has a molecular weight lower than those obtained in Examples 1 to 3 and it was poor in a color tone.

COMPARATIVE EXAMPLE 2

The procedures of Example 1 were followed with the exception that, in place of sodium 4-hydroxybutyrate, 4.45 g (0.0543 mole) of sodium acetate was used, yielding 49.26 g (84%) of polyphenylene sulfide in a greyish white color. This product was found to have an inherent viscosity [$\eta_{inn}$] of 0.15.

EXAMPLE 4

The procedures of Example 1 were followed with the exception that 0.269 g of 1,2,4-trichlorobenzene was additionaly used, yielding 49.85 g (85%) of polyphenylene sulfide. This product was found to have an inherent viscosity [$\eta_{inn}$] of 0.19.

EXAMPLE 5

A 1-liter autoclave was charged with a solution of 42.7 g (0.543 mole) of sodium sulfide (concentration: 71.3%) and 68.47 g (0.543 mole) sodium 4-hydroxybutyrate in 200 ml of water, and 297 ml of N-methylpyrrolidone. The autoclave was elevated to 154° C.in a stream of nitrogen gas and 295 ml of the mixture was removed from the autoclave. Gases removed was found to contain 0.01 mole of hydrogen sulfide gas.

The autoclave was then cooled down to 100° C. and 102 ml of a solution of 78.63 g (0.533 mole) of p-dichlorobenzene in 102 ml of N-methylpyrrolidone. The mixture was then reacted at 260° C. for 3 hours.

After completion of the reaction, the autoclave was opened and 1 liter of water was poured onto the reaction mixture, and the precipitated material was washed twice with 1 liter of water and once with 1 liter of acetone. The material was then dried by heating at 100° C. in vacuo over the period of 20 hours, yielding 41.5 g (72%, based on p-dichlorobenzene) of a polymer in a white color. This product was found to be insoluble when an inherent viscosity [$\eta_{inn}$] of 0.17 was measured in 1-chloronaphthalene at a concentration of 0.4 g/dl at a temperature of 206° C. Its melting point [Tm] was Tm=278° C.

It was further found that the reaction mixture recovered was colored in pale yellow, and a small amount of scars was formed on the autoclave.

An infrared absorption spectrum analysis has revealed that this product had an absorption peak at 1,700 cm$^{-1}$ based on the carbonyl group.

An infrared absorption spectrum is shown in FIGURE.

EXAMPLE 6

The procedures of Example 5 were followed with the exception that the amount of sodium 4-hydroxybutyrate was Changed from 68.47 g (0.543 mole) to 89.01 g (1.300 moles), yielding 42.4 g (73% based on p-dichlorobenzene) of polyphenylene sulfide. This product was found to be insoluble when an inherent viscosity [$\eta_{inn}$] was measured in 1-chloronaphthalene at a concentration of 0.4 g/dl at a temperature of 206° C. Its melting point [Tm]was Tm=277° C.

The polymer was found to be the same as obtained in Example 5 as a result of observation for infrared absorption spectrum.

EXAMPLE 7

The procedures of Example 5 were followed with the exception that, in place of 68 47 g (0.543 mole) of sodium 4-hydroxybutyrate, 83.6 g (0.543 mole) of sodium 6-hydroxyhexanoate was used, yielding 38 05 g (66% based on p-dichlorobenzene) of a polymer.

This product was found to be insoluble when an inherent viscosity [$\eta_{inn}$] was measured in 1-chloronaphthalene at a concentration of 0.4 g/dl at a temperature of 206° C. Its melting point [Tm] was 275° C.

COMPARATIVE EXAMPLE 3

The procedures of Example 5 were followed with the exception that sodium 4-hydroxybutyrate was not used and an additional amount of 68.07 g of p-dichlorobenzene was added in order to allow the amount of p-dichlorobenzene to become equimolar with respect to the mole of sulfur remaining in the autoclave because the amount of hydrogen sulfide gas contained in the discharged gases was as high as 0.08 mole at the time of dehydration, yielding 13.5 g (27% based on p-dichlorobenzene) of a polymer. This product was found to have an inherent viscosity [$\eta_{inn}$]of 0.03 when measured in 1-chloronaphthalene at a concentration of 0.4 g/dl at a temperature of 206° C. Its melting point [Tm] was Tm=232° C.

It was further found that the solution after the reaction was colored in dark brown and a malodor was emitted.

COMPARATIVE EXAMPLE 4

The procedures of Example 5 were followed with the exception that, in place of 68.47 g (0.543 mole) of sodium 4-hydroxybutyrate, 21.7 g (0.543 mole) of sodium hydroxide was used, yielding 51.6 g (88% based on p-dichlorobenzene) of a polymer.

This product was found to have an inherent viscosity [$\theta_{inn}$] of 0.10 when measured in 1-chloronaphthalene at a concentration of 0.4 g/dl at a temperature of 206° C.

The solution after the reaction was colored in dark brown.

COMPARATIVE EXAMPLE 5

The procedures of Example 5 were followed with the exception that, in place of sodium 4-hydroxybutyrate, sodium N-methyaminobutyrate was used, yielding 48.2 g (82% based on p-dichlorobenzene) of a polymer. This product was found to have an inherent viscosity [$\theta_{inn}$] of 0.14 when measured in 1-chloronaphthalene at a concentration of 0.4 g/dl at a temperature of 206° C.

The solution after the reaction was colored in dark brown. It was found that an additive of p-dichlorobenzene and sodium N-methylaminobutyrate was detected in the reaction mixture in the amount of 3,000 ppm so that it was assumed the additive was added to the polymer terminal and p-dichlorobenzene was lost in a large amount.

As have been described hereinabove, the present invention presents the advantages.

The use of the metallic salt of $\omega$-hydrocarboxylic acid as a polymerization promoter or assistant permits a stable polymerization even if a large quantity of water is contained in the reaction system, yielding a polyarylene sulfide having a sufficiently high molecular weight with high efficiency.

The process permits an easy recovery of the polymerization promoter or aid.

The process also enables the use of alkali metal sulfides or hydrosulfides in the form of a hydrate or an aqueous mixture which is readily available, such as commercially available or industrial grade hydrous sodium sulfide, as they are without dehydration.

The process is a useful process for preparing polyarylene sulfides with a high efficiency in high yields, which have excellent properties such as a sufficiently high molecular weight and a high degree of whiteness.

The use of the metallic salt of ω-hydrocarboxylic acid at a particular ratio can provide a novel polyarylene sulfide in high yields without causing any side reactions, so that the product is not colored with any by-products, thus yielding the product having a high degree of whiteness. The metallic salt of ω-hydrocarboxylic acid used can be recovered as a lactone for re-use. The polyarylene sulfide is provided with a carbonyl group, so that it is industrially useful.

What is claimed is:

1. A process for preparing a polyarylene sulfide comprising the step of contacting a sulfur source with a metallic salt of ω-hydroxycarboxylic acid of the general formula:

$$HO-(CH_2)_n-COOM$$

wherein M is an alkali metal and n is an integer of 2 to 8, and a dihalogen compound in an organic polar solvent.

2. A process as claimed in claim 1, wherein:
    the sulfur source is an alkali metal sulfide, an alkali metal hydrosulfide or hydrogen sulfide.

3. A process as claimed in claim 1, wherein:
    the sulfur source is sodium sulfide or sodium hydrosulfide.

4. A process as claimed in claim 1, wherein:
    the metallic salt of ω-hydroxycarboxylic acid is sodium 4-hydroxybutyrate, sodium 5-hydroxyvalerate, or sodium 6-hydroxycaprylate.

5. A process as claimed in claim 1, wherein:
    the organic polar solvent is a an aprotic organic solvent.

* * * * *